(12) United States Patent
Cianciotto

(10) Patent No.: US 7,386,214 B1
(45) Date of Patent: Jun. 10, 2008

(54) HOMOGENIZING OPTICAL BEAM COMBINER

(75) Inventor: Frank T. Cianciotto, Tehachapi, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/670,320

(22) Filed: Feb. 1, 2007

(51) Int. Cl.
*G02B 6/00* (2006.01)

(52) U.S. Cl. .................. 385/133; 385/45; 362/551; 359/598

(58) Field of Classification Search ............... 385/133
See application file for complete search history.

(56) References Cited

U.S. PATENT DOCUMENTS

| | | | |
|---|---|---|---|
| 3,825,741 A | 7/1974 | Morton et al. | |
| 4,632,513 A | 12/1986 | Stowe | |
| 4,964,692 A | 10/1990 | Prescott | |
| 5,054,869 A * | 10/1991 | Doyle | 385/133 |
| 5,054,874 A | 10/1991 | Hill et al. | |
| 5,375,185 A | 12/1994 | Hermsen | |
| 5,553,183 A | 9/1996 | Bechamps | |
| 5,604,837 A | 2/1997 | Tanaka | |
| 5,701,191 A | 12/1997 | Iwasaki | |
| 5,727,108 A | 3/1998 | Hed | |
| 5,803,575 A | 9/1998 | Ansems et al. | |
| 5,812,713 A * | 9/1998 | Allen et al. | 385/39 |
| 5,828,505 A | 10/1998 | Farmiga | |
| 6,038,361 A | 3/2000 | Yoshikawa et al. | |
| 6,104,857 A | 8/2000 | Ishiharadsa et al. | |
| 6,125,228 A | 9/2000 | Gong | |
| 6,149,289 A | 11/2000 | Kuramitsu et al. | |
| 6,324,330 B1 | 11/2001 | Stites | |
| 6,332,688 B1 | 12/2001 | Magarill | |

(Continued)

FOREIGN PATENT DOCUMENTS

JP 11-017969 1/1999

(Continued)

OTHER PUBLICATIONS

U.S. Appl. No. 10/744,922, filed Dec. 23, 2003, Cianciotto et al.

(Continued)

*Primary Examiner*—Sung Pak
*Assistant Examiner*—Chad H Smith
(74) *Attorney, Agent, or Firm*—MacPherson Kwok Chen & Heid LLP; Greg J. Michelson

(57) ABSTRACT

An optical homogenizing and combining apparatus includes a one piece hollow tubular body having a first and second input legs and an output leg, each leg having a polygonal cross-section and a highly reflective interior surface, the first input leg being configured to receive a first light beam having a first intensity and spectral content that is reflected within the first leg to provide a first leg output beam, the second input leg being configured to receive a second light beam having a second intensity and spectral content that is reflected within the second leg to provide a second leg output beam, the first and second leg output beams being combined and reflected in the third leg to provide an output beam that is a combination of the first intensity and spectral content and the second intensity and spectral content and having a top hat profile.

16 Claims, 5 Drawing Sheets

U.S. PATENT DOCUMENTS

| | | |
|---|---|---|
| 6,366,308 B1 | 4/2002 | Hawryluk et al. |
| 6,513,937 B1* | 2/2003 | Dehmlow .................... 353/94 |
| 6,771,870 B2 | 8/2004 | Strobl et al. |
| 6,792,190 B2 | 9/2004 | Xin et al. |
| 6,801,701 B1 | 10/2004 | Montgomery et al. |
| 6,857,764 B2 | 2/2005 | Kohno |
| 6,986,591 B2 | 1/2006 | Pate |
| 7,113,684 B1* | 9/2006 | Cianciotto et al. .......... 385/133 |
| 7,171,097 B2 | 1/2007 | Cianciotto et al. |
| 2001/0005222 A1 | 6/2001 | Yamaguchi |
| 2004/0137089 A1 | 7/2004 | Dinan |
| 2004/0137189 A1 | 7/2004 | Tellini et al. |
| 2005/0084210 A1 | 4/2005 | Cha |
| 2005/0112639 A1 | 5/2005 | Wang et al. |
| 2005/0162853 A1* | 7/2005 | Jain .......................... 362/298 |
| 2005/0237621 A1 | 10/2005 | Peterson |
| 2005/0270652 A1 | 12/2005 | Voss et al. |
| 2006/0256445 A1 | 11/2006 | Zueger |
| 2006/0256449 A1 | 11/2006 | Cianciotto et al. |

FOREIGN PATENT DOCUMENTS

| | | |
|---|---|---|
| JP | 11-250227 | 9/1999 |

OTHER PUBLICATIONS

U.S. Appl. No. 10/857,073, filed May 28, 2004, Cianciotto et al.

* cited by examiner

HOMOGENIZING OPTICAL BEAM COMBINER

TECHNICAL FIELD

The present invention relates generally to optical guides, and more particularly to a homogenizing optical beam combiner.

BACKGROUND

Optical devices that combine or homogenize an incoming light beam are known, yet such devices typically include heavy, expensive, and delicate components that may limit the application of these useful techniques. Previous attempts have included the use of a hex-shaped glass rod with an exterior cladding configured to provide reflection of light within the glass rod. Such a glass rod is typically very expensive to produce, extremely fragile, and has the disadvantage that light may leak out of the glass rod if the exterior cladding is damaged. When an input beam is non-uniform, additional components are typically required to produce a uniform intensity distribution. Such additional components contribute to the increased cost, weight, and complexity of the optical system since these additional components may be subject to misalignment or may be more susceptible to optical contamination. Further, the use of multiple optical elements may lead to substantial intensity losses as a light beam propagates through the multiple optical elements. Thus, there remains a need for an apparatus and method to provide light combining and homogenization in a rugged, compact, and low cost manner.

SUMMARY

Apparatuses, systems, and methods are disclosed herein to provide light combining and light homogenization in a single, ruggedized package in a cost-effective manner for a multitude of commercial and military applications. For example, embodiments of the present invention have particular application to the aircraft and automotive industries, where lower maintenance costs and lower initial purchase costs may lead to significant cost savings over the lifetime of various products. Further, the structures and methods disclosed have application to diverse technology areas including optical components, entertainment, mass communications, interior/exterior aircraft lighting, and aircraft runway lighting.

Embodiments of the present invention may combine a plurality of Gaussian input beams into one highly homogeneous output beam having a uniform, top hat intensity profile where the intensity of the output beam is a summation of the intensities of the input beams. This is achieved at a high efficiency, greater than about 95%, and without requiring critical alignment of optical components.

Specifically, in accordance with an embodiment of the present invention, an optical homogenizing and combining apparatus includes a one piece hollow tubular body having a first and second input legs and an output leg. Each leg has a polygonal cross-section and a highly reflective interior surface. The first input leg is configured to receive a first light beam having a first intensity and spectral content that is reflected within the first leg to provide a first leg output beam. The second input leg is configured to receive a second light beam having a second intensity and spectral content that is reflected within the second leg to provide a second leg output beam. The first and second leg output beams are combined and reflected in the third leg to provide an output beam that is a combination of the first intensity and spectral content and the second intensity and spectral content and having a top hat profile.

According to another embodiment, a method of homogenizing and combining light beams includes the operation of receiving a first light beam in a first leg of a one piece hollow tubular body having the first leg, a second leg, and a third leg, where each leg has a polygonal cross section and a highly reflective interior surface. The method further includes the operations of reflecting the received first light beam within the first leg to produce a first homogenized light beam, receiving a second light beam in the second leg of the body, reflecting the received second light beam within the second leg to produce a second homogenized light beam, combining the first and the second homogenized light beams into a combined beam, and reflecting the combined beam within the third leg of the body to produce an output beam having a top hat profile.

One or more embodiments teach structures and methods that fulfill long felt needs in the industry by producing a light homogenizer and combiner for combining a plurality of homogenized input beams each having a top hat profile and a single color, where for example the incoming light beam comprises a broad-spectrum white light having a non-uniform, Gaussian intensity distribution. The disclosed structure may be beneficial because it does not include delicate components such as a glass rod, and thus may be manufactured more economically and used more reliably. Additionally, the disclosed structure may be rugged and used in applications that may receive vibration or physical shock. Because no optical or refractive components are needed, alignment issues are eliminated.

The scope of the present invention is defined by the claims, which are incorporated into this section by reference. A more complete understanding of embodiments of the present invention will be afforded to those skilled in the art, as well as a realization of additional advantages thereof, by a consideration of the following detailed description. Reference will be made to the appended sheets of drawings that will first be described briefly.

DETAILED DESCRIPTION

Figure 1:
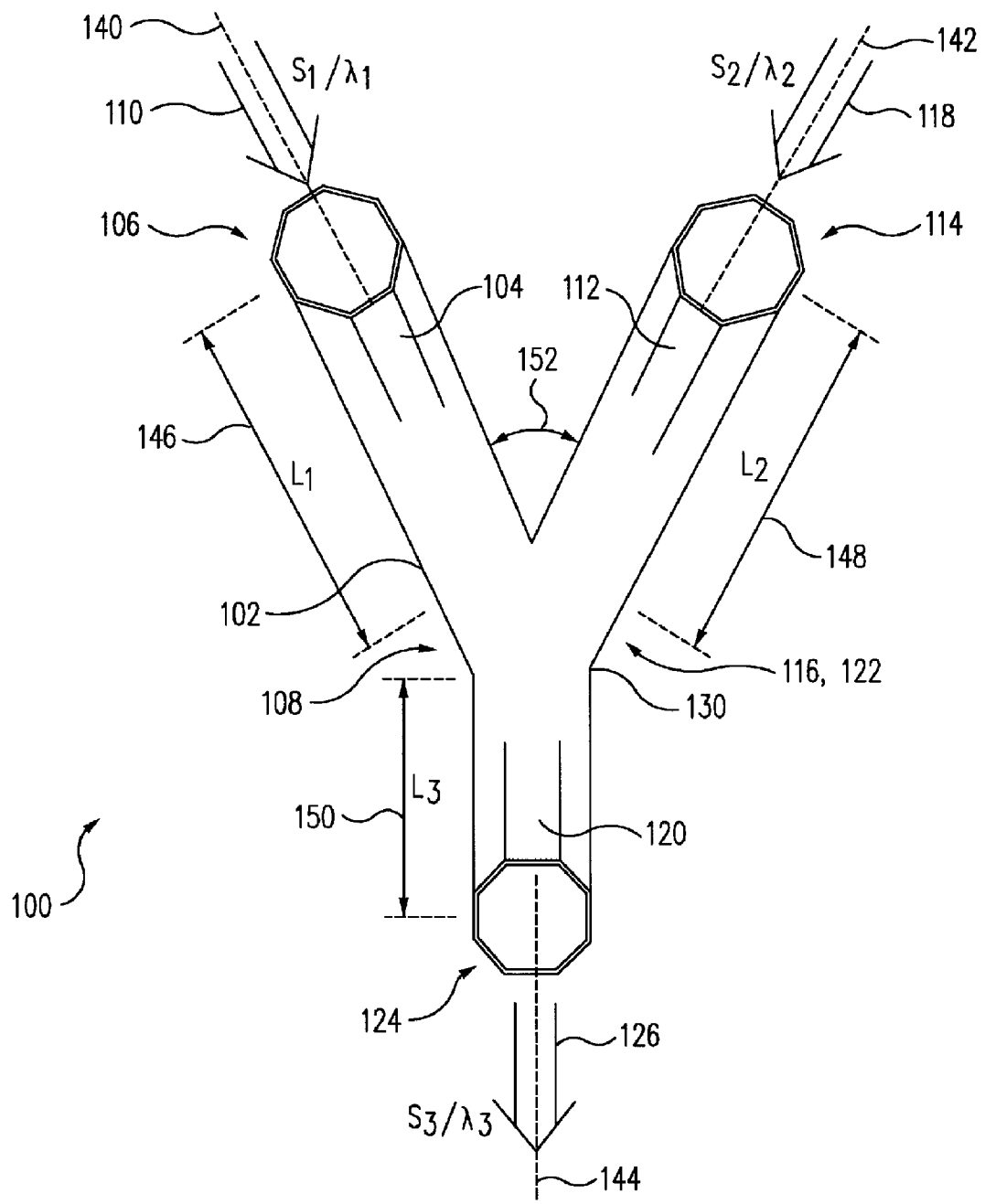
FIG. 1 shows a side view of a light homogenizing and combining apparatus, in accordance with an embodiment of the present invention.

Embodiments of the present invention and their advantages are best understood by referring to the detailed description that follows. It should be appreciated that like reference numerals are used to identify like elements illustrated in one or more of the figures.

A strong requirement and market exists for a low-cost, rugged device that can operate efficiently as a light combiner and homogenizer that requires no optical alignment. A device according to embodiments of the present invention may solve at least three key problems without the use of any refractive elements, including beam splitters, and lenses, etc. These three key problems include a) converting a Gaussian profile input light beam into a highly homogenous, top hat profile beam, b) combining a plurality of input beams into a single output beam having a higher intensity, and c) combining the plurality of input beams with different spectral profiles into a new output beam having a spectral profile that is different from each of the input beams. Since refractive elements are eliminated, so also is the requirement for alignment and the possibility of misalignment. Further, the rugged design allows use in environments where high vibration or shock loads may be encountered.

FIG. 1 shows a side view of a light homogenizing and combining apparatus (LHCA) 100, in accordance with an embodiment of the present invention. Preferably, LHCA 100 comprises a one-piece, hollow tubular member, or tubular body 102 having a polygonal cross-section and a highly reflective interior surface. Body 102 includes a first leg 104 having a first end 106 and a second end 108. First leg 104 first end 106 is configured to receive a first Gaussian light beam 110 of a first intensity and spectral content $S_1$ or color $\lambda_1$, where light beam 110 is reflected within first leg 104 to provide a first leg output beam that is at least partially homogenized and emitted from first leg 104 second end 108. Similarly, body 102 includes a second leg 112 having a first end 114 and a second end 116. Second leg 112 first end 114 is configured to receive a second Gaussian light beam 118 of a second intensity and spectral content $S_2$ or color $\lambda_2$, where light beam 118 is reflected within second leg 112 to produce a second leg output beam that is at least partially homogenized and emitted from second leg 112 second end 116. While two input legs are shown, this is not considered limiting.

Finally, body 102 also includes a third leg 120 having a first end 122 and a second end 124. First leg 104 second end 108 and second leg 112 second end 116 are joined with third leg 120 first end 122 to form a closed junction 130 having a highly reflective interior surface. First leg 104 output beam and second leg 112 output beam may be combined and reflected in third leg 120 to provide a third leg output beam 126 emitted from the third leg second end 124, where third leg output beam 126 has a third intensity and spectral content $S_3$ or color $\lambda_3$ that is a combination of the first intensity and spectral content $S_1$ and the second intensity and spectral content $S_2$, and where third leg output beam 126 has a homogenized top hat profile. In one alternative, a third leg output beam from a first LHCA 100 may be applied as an input beam to a second LHCA 100, so that three or more Gaussian light beams may be combined in a sequential or serial manner.

While a hexagonal cross-section for LHCA 100 is preferred, other geometrical cross-sections may also be used including triangular, square, pentagonal, heptagonal, and octagonal, for example. Further, first leg 104, second leg 112, and third leg 120 may each have the same or a different geometrical cross-section. In this disclosure, the color of light refers to the wavelength or frequency distribution, band, or spectral content of the light and may include both visible and invisible wavelengths. While a particular spectra or wavelength is described for each beam, it is understood that the color of a beam refers equally to its frequency components and associated intensity for each component, and may also be referred to as frequency profile, spectral content, or spectral power distribution (SPD) for the associated beam.

First leg 104 may be arranged about a central, longitudinal axis 140 that is normal or perpendicular to the planar cross-section of first end 106 and co-linear with a central longitudinal axis of first leg 104. First leg 104 is configured to receive and reflect the first input light beam 110 to produce at least a partially homogenized input beam within the first leg 104 as first input light beam 110 is reflected by the highly reflective interior surface of leg 104. Longitudinal axis 140 can include a central line passing symmetrically through the long or axial direction of first leg 104 and extending further into body 102, where the longitudinal axis 140 is equidistant from the highly reflective interior surfaces of first input leg 104.

Similarly, second leg 112 may be arranged about a central, longitudinal axis 142 that is normal or perpendicular to the planar cross-section of second leg 112 and co-linear with a central longitudinal axis of second leg 112. Second leg 112 is configured to receive and reflect the second input light beam 118 to produce at least a partially homogenized input beam within the second leg 112. Longitudinal axis 142 can include a central line passing symmetrically through the long or axial direction of second leg 112 and extending further into body 102, where the longitudinal axis 142 is equidistant from the highly reflective interior surfaces of second input leg 112. In this manner, each received light beam (110, 118) is at least partially homogenized in the respective input leg (104, 112). Alternatively, the length and width of each leg (104, 112) may be sufficient to provide complete homogenization of the input light beam.

Third leg 120 second end 124 may also be arranged about a central, longitudinal axis 144 that is normal or perpendicular to the planar cross-section of third leg 120 second end 124 and co-linear with a central longitudinal axis of third leg 120. In this manner, LHCA 100 may combine a plurality of incoming Gaussian profile light beams into a new single homogenized output beam. The intensity or amplitude of the output beam may be the sum of the plurality of input beams minus a negligible loss of about 5%. In addition, if the wavelengths (color) of the plurality of input beams are different from each other, then the output beam will have a new, derivative wavelength (color) so LHCA 100 may function as a wavelength blender. In this manner, LHCA 100 performs at least two functions that traditionally may require a minimum of three separate optical components. Therefore, LHCA 100 may provide homogenization and optical combining operations in a more compact, lower weight, and rugged manner while eliminating alignment requirements.

As used in this disclosure, homogenization includes a process of reflecting light off highly reflective interior surfaces of body 102 a minimum of five times in order to produce an output beam having a top hat profile. In one example, homogenization includes converting a smaller diameter light beam with a Gaussian intensity distribution into a larger diameter light beam with a top hat intensity distribution.

The term Gaussian, or the phrase Gaussian distribution, refers generally to a normal or bell-shaped spatial intensity distribution characterized by a location of higher intensity near the center of a region or cross-section that may fall off uniformly towards the sides of the region. In this case, the mode of the Gaussian curve corresponds to the center part of the input light beam. The phrase top hat, or top hat distribution, refers to a substantially equal spatial intensity distribution along the region or cross-section in a direction perpendicular to the output beam path. Additionally, the input light source may be composed of wavelengths corresponding to one specific color, a plurality of specific colors, or may comprise white light.

As shown in FIG. 1, the tubular leg portions of body 102 having a polygonal cross-section shape provide a plurality of planar side members having a highly reflective surface, so that light beams reflecting off an interior surface of these planar side members are reflected or folded over at least five times. First leg 104 has a first length $L_1$ 146 from first end 106 to middle portion 130. Similarly, second leg 112 has a second length $L_2$ 148 from second end 114 to middle portion 130. Finally, third leg 120 has a third length $L_3$ 150 from the middle portion 130 to third leg 120 second end 124 comprising a closed Y-junction point, a closed intersection, also described as a first and second bending points where the first input leg 104 and the second input leg 112 meet the output leg 120. Middle portion 130 is closed to retain light, to provide reflection, and to efficiently guide light received from the first leg and second leg into the third leg.

In one embodiment, each of the lengths $L_1$, $L_2$, and $L_3$ is sufficient to provide at least five reflections of the received light in the respective leg portion (104, 112, 120). In another embodiment, the sum of each through path length ($L_1+L_3$) or ($L_2+L_3$) for an input light beam to the output end portion 122 is sufficient to provide at least five reflections of the received light in both the associate input leg (104 or 112) and the output leg 120. In both cases, the input light beams and combined light beam are reflected sufficiently to provide a homogenized, top hat profile output.

While it is preferable that an angle 152 at which first leg 104 and second leg 112 meet at middle portion 130 is symmetrical with respect to third leg central axis 144, it is not necessarily so. In the preferred embodiment, axes 140, 142, and 144 may be coplanar, and axis 144 may bisect the angle between the point in middle portion 130 where axes 140 and 142 meet, where the angle between axes 140 and 142 may range from about 15° to about 45° degrees. Alternatively, axis 140 may be co-linear with axis 144 and coplanar with axis 142, while axis 142 meets axis 144 at an angle from about 15° to about 45° degrees. Similarly, axis 142 may be co-linear with axis 144 and coplanar with axis 140, while axis 140 meets axis 144 at an angle from about 15° to about 45° degrees. Calculations have shown that it is preferable for angle 152 to be about 45° or less. In yet another alternative, none of the axes (140, 142, 144) need be coplanar, co-linear, or even symmetrical. Body 102 may have three input legs oriented as the adjacent edges of a tetrahedron, where the output leg is superposed at a vertex of the adjacent edges.

Figure 2:
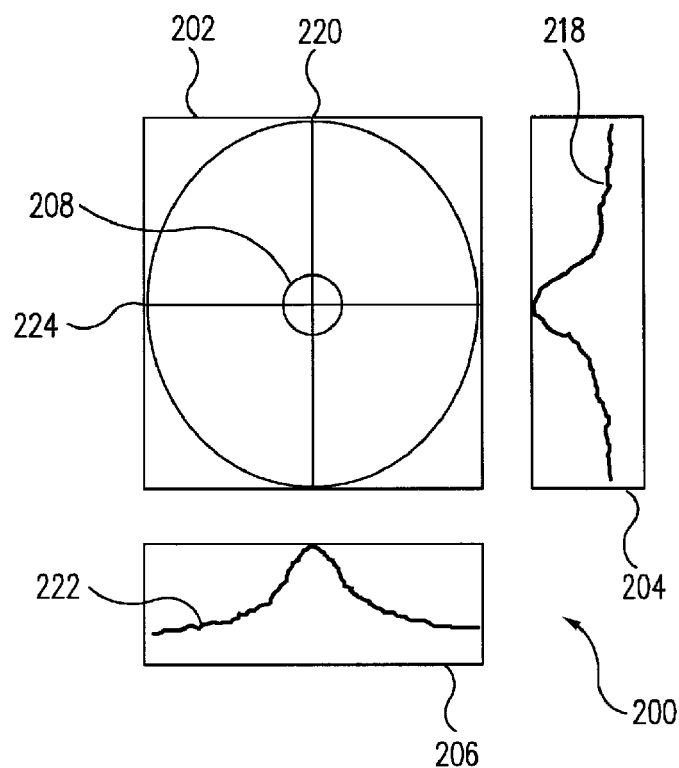
FIG. 2 shows a graphical intensity depiction including three plane views of an input Gaussian light beam, in accordance with an embodiment of the present invention.

FIG. 2 shows a graphical intensity depiction 200 including three plane views (202, 204, 206) of an input Gaussian light beam 208, in accordance with an embodiment of the present invention. Depiction 200 includes a frontal plane view 202 showing a two-dimensional intensity distribution of an exemplary cross-section of the input Gaussian light beam 208, a profile plane view 204 showing a Gaussian distribution curve 218 depicting the intensity across a central vertical diameter 220 or span, and a horizontal plane view 206 showing a Gaussian distribution curve 222 depicting the intensity across a central horizontal diameter 224 or span.

As shown in FIG. 2, the light intensity profile varies across the diameter of the optical channel, in a direction perpendicular to the cross section of the channel, with a typical Gaussian intensity distribution. The light source may be a single point source such as a fiber optic cable, multiple point sources such as a fiber bundle, or an omni-directional source where only a portion of the emitted light from the source is received by the homogenizing and combining device. The wavelength of each light source may be monochromatic or polychromatic, coherent or incoherent.

Figure 3:
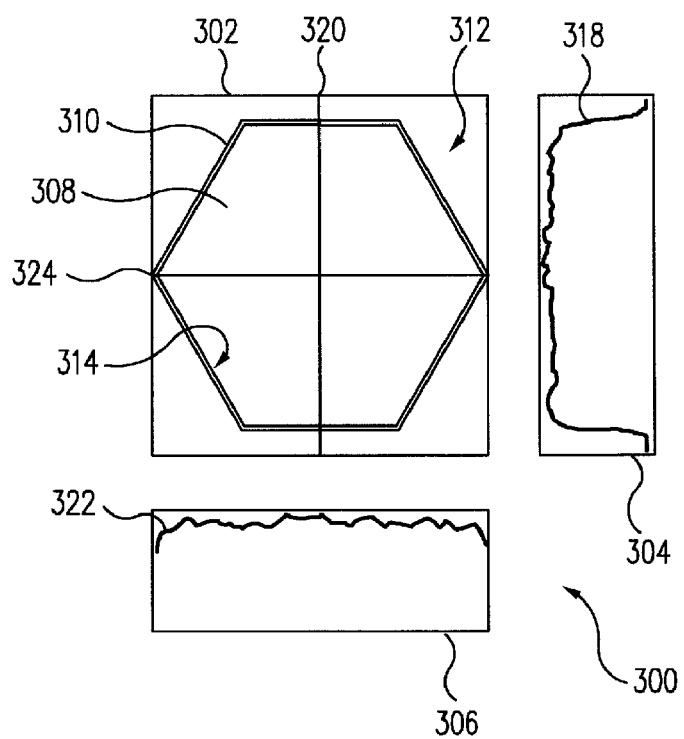
FIG. 3 shows a graphical intensity depiction including three plane views of an output top hat light beam from a tubular member having a hollow polygonal cross-section and a highly reflective interior surface, in accordance with an embodiment of the present invention.

FIG. 3 shows a graphical intensity depiction 300 including three plane views (302, 304, 306) of an output top hat light beam 308 from a tubular member 310 having a hollow polygonal cross-section 312 and a highly reflective interior surface 314, in accordance with an embodiment of the present invention. In this example, the polygonal cross-section of tubular member 310 may be a hexagon comprising six, equal-size planar side members, but this is not considered limiting. Specifically, depiction 300 includes a frontal plane view 302 showing an end view of a tubular member having a two-dimensional intensity distribution for an exemplary cross-section of the output top hat light beam 308, a profile plane view 304 showing a top hat distribution curve 318 depicting the intensity across a central vertical diameter 320 or span, and a horizontal plane view 306 showing a top hat distribution curve 322 depicting the intensity across a central horizontal diameter 324 or span of the polygonal cross-section.

As shown in FIG. 3, the light intensity profile of output light beam 308 does not substantially vary across the diameter of the optical channel, in a direction perpendicular to the cross section of the channel, with a typical top hat intensity profile or distribution. The top hat intensity profile may be provided for all homogenized output light beams. This conversion to a top hat profile is important especially when LHCA 100 is used to project an output beam into a bundle of fibers. The homogenous nature of the output beam will assure that each individual fiber within the bundle will receive the same intensity of light. In this manner, the highly reflective interior surfaces of body 102 may cause a light beam to fold over onto itself numerous times while passing through body 102, thus reshaping the original input Gaussian profile beam into a highly-uniform, homogenous top hat profile beam.

Input light beams (110, 118) may each be a point source of white light having a wavelength range from about 380 nm to 780 nm covering the spectrum of visible light. For visible light, a silver reflective surface within tubular body 102 will provide the highest efficiency. Alternatively, input light beams (110, 118) may include any light components above and/or below the visible spectrum. For this disclosure, white light may include a light beam that includes a plurality of wavelengths, and is thereby differentiated from single wavelength light beam having a particular color.

The source of input light beams (108, 116) may be any light conductor or light emitter including a light conducting tubular member placed adjacent to or partially within an input end portion (106, 114), an output end portion of an optical cable such as a fiber-optic cable or bundle placed adjacent to or partially within an input end portion (106, 114), and/or a white light emitter such as an incandescent lamp, a fluorescent lamp, an Organic Light Emitting Diode (OLED), a chemical light source including a flame, the sun, and/or any other source of illumination directed toward, placed adjacent to, or partially within an input end portion (106, 114). The insertion distance partially within an input end portion (106, 114) may be up to about twice the diameter of an input light beam (110, 118) through an insertion plane that may be parallel to an outer edge of planar input end portions (106, 114).

Figure 4:
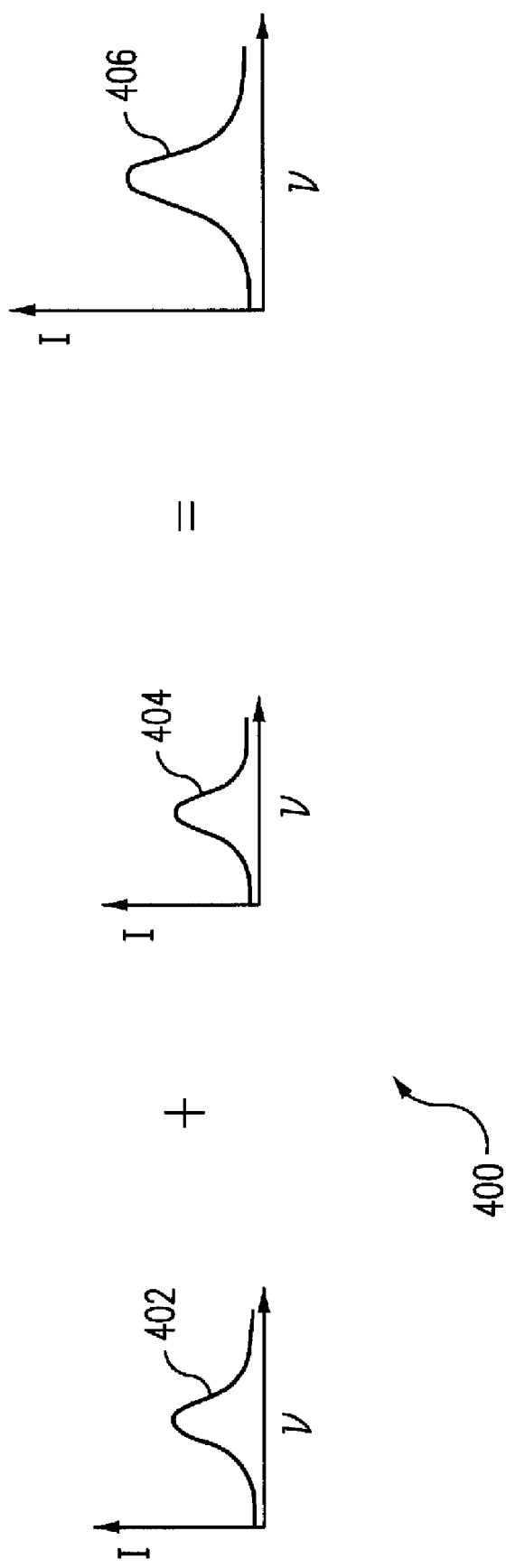
FIG. 4 shows a graphical sum illustrating an exemplary combination of a first input beam and a second input beam, where a combined output beam has an intensity that is the sum of the intensities of the input beams, according to an embodiment of the present invention.

FIG. 4 shows a graphical sum 400 illustrating an exemplary combination of a first input beam 402 and a second input beam 404, where a combined output beam 406 has an intensity that is the sum of the intensities of the input beams (402, 404), according to an embodiment of the present invention. When the input beams are of different wavelengths (i.e. are of different colors) the output beam will be of a third wavelength that is a combination of the input wavelengths. In this manner, a homogenized output beam having a third color may be generated (color generator) based on two Gaussian input beams having two different colors.

Figure 5:
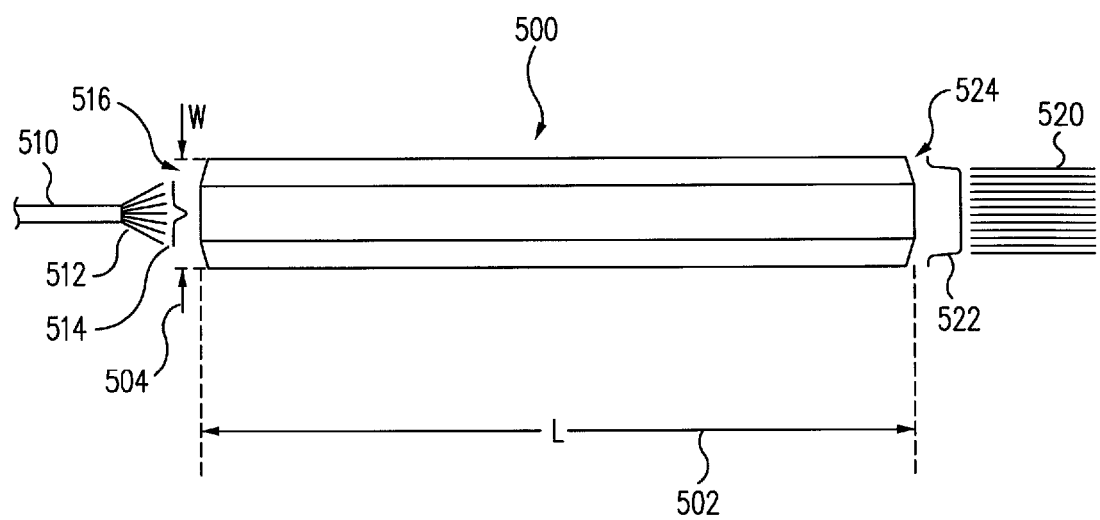
FIG. 5 shows a side view of an exemplary hollow tubular member portion of light homogenizing and combining body, in accordance with an embodiment of the present invention.

FIG. 5 shows a side view of an exemplary hollow tubular member, or hex tube portion 500, in accordance with an embodiment of the present invention. Hex tube portion 500 corresponds to an embodiment of any of the input legs (104, 112) or the output leg 120, shown in FIG. 1. For maximum efficiency, and to achieve a top hat profile that may be uniform to within 98% of the optimum design, the hex tube portion 500 preferably has a length L 502 and a width W 504, where the W:L ratio may be approximately 1:6 for optimal homogenization at minimal cost. Stated differently, the measured intensity difference across the homogenized output beam may be uniform to within 2%. However, a range of W:L of about 1:5 to about 1:7 may also be acceptable.

Body 102 may be fabricated in an electroplating or electroforming process where a shaped form or mandrel corresponding to the interior regions of body 102 may be plated to build up a "stand alone" thickness where the highly reflective interior surface plating surrounding the mandrel is structurally self-supporting. The mandrel may then be removed by another process including melting, chemically etching, and/or exploiting some other property such as a difference between the thermal coefficients of expansion between the mandrel and the plating in order to remove the mandrel and form body 102. In one embodiment, an aluminum form or mandrel may first be coated with silver, gold, or other highly reflective plating material, and then coated with nickel or other stronger material that may bond with and/or structurally support the highly reflective plating to provide structural rigidity for the body 102 having a highly reflective interior surface. The highly reflective layer may be very thin because the majority of structural support for body 102 is provided by an outer plating layer.

In an exemplary embodiment, the highly reflective layer may only be a few atomic layers thick while the outer layer may be composed of nickel that may be approximately 0.002-inches thick. The thickness of the outer layer may be determined by the properties of the selected material and the rigidity requirements of a particular mission or application. By reducing the thickness of the highly reflective layer, the cost of the manufactured device may be kept low when the highly reflective material layer may be composed of silver, gold, or other precious metal. Generally, the composition of the highly reflective material depends upon the wavelength of light being reflected within the tubular member 102. In one preferred embodiment, the highly reflective material layer is composed of silver to reflect white light with maximum efficiency. Once the outer layer is formed, the aluminum form or mandrel may then be chemically melted away leaving the highly reflective, or highly polished, interior surface within body 102.

A light source 510 emits or conducts an input light beam 512 having a Gaussian intensity distribution 514 and applied to an input end 516 of portion 500. Light beam 512 may have a cone pattern where the light may be applied to a substantially central portion of input end 516, equidistant from each side of input end 516. Light beam 512 may then be applied to the highly reflective interior surface of the hex tube portion 500. As the applied light beam travels down the length L 502 it undergoes numerous reflections and emerges as an output beam 520 having a top hat profile 522 from an output end 524 of hex tube portion 500. During each of the reflections within an interior region of hex tube portion 500, the beam actually folds over onto itself resulting in the creation of a highly-uniform, homogenous top hat profile. After a minimum of five such reflections, the beam may be considered homogenous. In an actually constructed prototype, the length L 502 was 42 mm (millimeters) while the width W 504 (or diameter) was 7 mm.

Figure 6:
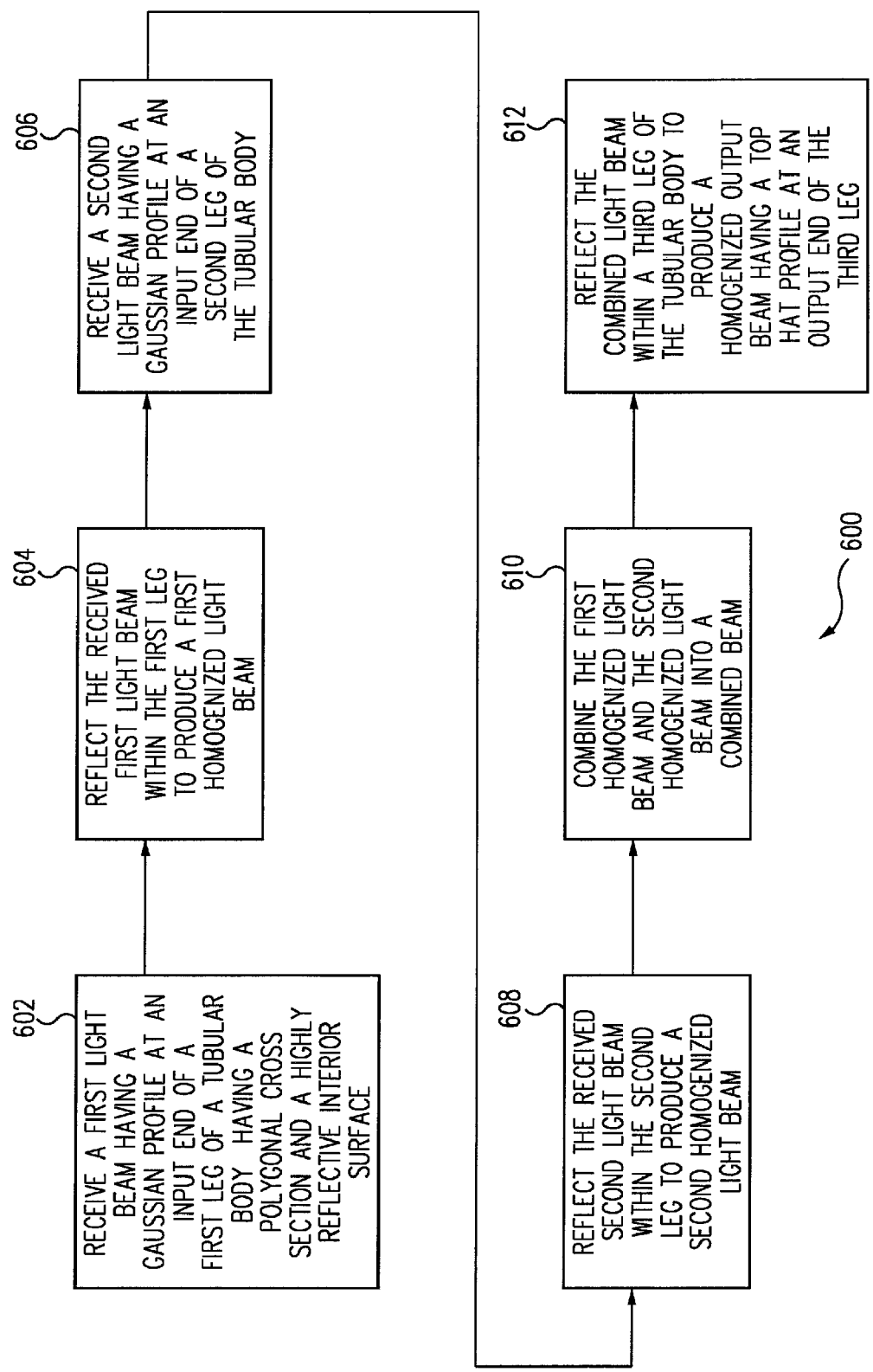
FIG. 6 shows operations in an exemplary light homogenizing and combining flow, according to an embodiment of the present invention.

FIG. 6 shows operations in a light homogenizing and combining flow 600, according to an embodiment of the present invention. In reference to FIGS. 1-6, flow 600 begins with receiving a first input light beam 110 having a Gaussian intensity profile (218, 222) at a first end 106 of first leg 104 of a tubular body 102 having a polygonal cross-section 312 and a highly reflective interior surface 314 in operation 602. In one example, the first light beam 110 may be emitted from a fiber optic cable 510 and applied to first input end 106. Flow 600 continues with reflecting the first input light beam 110 within the first leg 104 to produce a first homogenized input beam in operation 604. In this manner, the Gaussian first input light beam may be reshaped into a homogenous, top hat profile beam after repeated reflections from the inside surface of tubular body 102.

Flow 600 continues with receiving a second input light beam 118 having a Gaussian intensity profile (218, 222) at a first end 114 of a second leg 112 of a tubular body 102 having a polygonal cross-section 312 and a highly reflective interior surface 314 in operation 606. Flow 600 continues with reflecting the second input light beam 118 within the second leg 112 to produce a second homogenized input beam in operation 608.

After each input beam is at least partially homogenized, flow 600 continues with combining the first homogenized input beam and the second homogenized input beam in operation 610 within middle portion 130 of tubular body 102. Flow 600 concludes with reflecting the combined beam within third leg 120 to produce a combined homogenized output beam 126 at third leg 120 second end 124. In this manner, combined homogenized output beam 126 may have a top hat profile and amplitude that is nearly the sum of the amplitudes of the input beams. Further, when the input beams (110, 118) have different wavelengths, the output beam 126 will have a new color that is a combination of the wavelengths present in the input beams.

Although an exemplary embodiment of flow 600 shows a combination of two Gaussian light sources, this process may be utilized for three or more input beams, where the transmitted beam from a prior homogenization and combination stage (i.e. a first LHCA 100) may be asserted to a latter homogenization and combination stage (i.e. a second LHCA 100) so that more than two input beams may be homogenized and combined to produce a top hat profile output beam that is a combination of all input beams. Optical analysis using industry standard ray tracing programs have validated the design and utility of LHCA 100.

Specifically, analysis has computed that the overall system will have an efficiency of at least 94.5%, while initial measurements of a constructed prototype have shown efficiency measurements of greater than 95.5%.

Embodiments described above illustrate but do not limit the invention. It should also be understood that numerous modifications and variations are possible in accordance with the principles of the present invention. Accordingly, the scope of the invention is defined only by the following claims.

I claim:

1. An optical homogenizing and combining apparatus, comprising:
   a one piece hollow tubular body having a first input leg, a second input leg, and an output leg, the first input leg, the second input leg, and the output leg each having a polygonal cross-section with five or more sides and a highly reflective interior surface, with the first input leg, the second input leg, and the output leg each further having a width to length ratio range of approximately 1:5 to 1:7;
   wherein the first input leg is configured to receive a first light beam having a first intensity and spectral content that is reflected within the first input leg to provide a first leg output beam, the second input leg is configured to receive a second light beam having a second intensity and spectral content that is reflected within the second input leg to provide a second leg output beam; and
   wherein the output leg is configured to receive the first and second leg output beams, which are combined and reflected at least five times in the output leg to provide an output beam that is a combination of the first intensity and spectral content and the second intensity and spectral content and having a top hat profile.

2. The apparatus of claim 1, wherein at least one of the first light beam and the second light beam has a Gaussian profile.

3. The apparatus of claim 1, wherein the polygonal cross-section comprises a pentagon, a hexagon, a heptagon, or an octagon.

4. The apparatus of claim 1,
   wherein the first input leg has a first central axis, the second input leg has a second central axis, and the output leg has a third central axis, and
   wherein the first central axis, the second central axis, and the third central axis are coplanar, with an angle between the first central axis and the second central axis being approximately within 15 to 45 degrees.

5. The apparatus of claim 4, wherein the first central axis and the third central axis are co-linear.

6. The apparatus of claim 1, wherein the first light beam is reflected at least five times within the first input leg and the second light beam is reflected at least five times within the second input leg.

7. The apparatus of claim 1, wherein the highly reflective interior surface includes an interior metal plating, with the interior metal plating supported by an exterior metal plating.

8. The apparatus of claim 7, wherein the exterior metal plating comprises nickel and the interior metal plating comprises silver or gold.

9. The apparatus of claim 8, wherein the first input leg, the second input leg, and the output leg are joined to form a closed junction having a highly reflective interior surface.

10. A method of homogenizing and combining light beams, the method comprising:
    receiving a first light beam in a first leg of a one piece hollow tubular body having the first leg, a second leg, and a third leg, the first leg, the second leg, and the third leg each having a polygonal cross section with five or more sides and a highly reflective interior surface, with the third leg further having a width to length ratio range of approximately 1:5 to 1:7, and with the body comprising a first metal to provide the highly reflective interior surface and a second metal to provide support for the first metal;
    reflecting the received first light beam at least five times within the first leg to produce a first homogenized light beam;
    receiving a second light beam in the second leg of the body;
    reflecting the received second light beam at least five times within the second leg to produce a second homogenized light beam;
    combining the first and the second homogenized light beams into a combined beam; and
    reflecting the combined beam at least five times within the third leg of the body to produce an output beam having a top hat profile.

11. The method of claim 10, wherein at least one of the first light beam and the second light beam has a Gaussian profile.

12. The method of claim 10, wherein the first light beam has a first intensity and spectral content, the second light beam has a second intensity and spectral content, and the output light beam has an intensity and spectral content that is a combination of the first intensity and spectral content and the second intensity and spectral content.

13. The method of claim 10, wherein the polygonal cross-section comprises a pentagon, a hexagon, a heptagon, or an octagon.

14. The method of claim 10,
    wherein the first leg has a first central axis, the second leg has a second central axis, and the third leg has a third central axis,
    wherein the first central axis, the second central axis, and the third central axis are coplanar, and
    wherein an angle between the first central axis and the second central axis is between about 15° to about 45°.

15. The method of claim 10, wherein the polygonal cross section of the first leg is different from the polygonal cross section of the second leg.

16. The method of claim 10, wherein light is one of supplied by and received by a fiber optic cable.

* * * * *